United States Patent [19]

Reymann et al.

[11] Patent Number: 4,943,229
[45] Date of Patent: Jul. 24, 1990

[54] BLOW MOLDING MACHINE

[75] Inventors: Wolfgang Reymann; Heiko-Ulrich Gropp, both of Hamburg; Klaus Vogel, Barsbüttel; Hartwig Müller, Lüdtjensee; Walter Wiedenfeld, Hamburg, all of Fed. Rep. of Germany

[73] Assignee: Krupp Corpoplast Maschinenbay GmbH, Hamburg, Fed. Rep. of Germany

[21] Appl. No.: 346,467

[22] Filed: May 2, 1989

[30] Foreign Application Priority Data

May 4, 1988 [DE] Fed. Rep. of Germany ....... 3815192

[51] Int. Cl.$^5$ .................. B29C 49/36; B29C 49/58
[52] U.S. Cl. .................................... 425/535; 425/540
[58] Field of Search ............... 425/535, 540, 529, 530, 425/526, 532; 264/543, 532

[56] References Cited

U.S. PATENT DOCUMENTS

| 2,901,769 | 9/1959 | Sherman et al. | 425/540 X |
| 3,954,370 | 5/1976 | Pollock et al. | 425/540 X |
| 4,036,925 | 7/1977 | Kauffman et al. | 264/543 X |
| 4,285,657 | 8/1981 | Ryder | 425/535 X |

FOREIGN PATENT DOCUMENTS 3101281 8/1982 Fed. Rep. of Germany ...... 425/540

Primary Examiner—Richard L. Chiesa
Attorney, Agent, or Firm—Harness, Dickey & Pierce

[57] ABSTRACT

The invention relates to a control means for actuating the valves for supplying pressurized blowing fluid and working fluid to the blow mold stations of the blow wheel of a blow mold machine. The blow wheel comprises a center-free wheel ring of which the outer periphery is rotatably supported on a base. Facing the inner periphery of the wheel ring there is a stationary rail on which carriages are adjustably mounted. The carriages accommodate cams for actuating the plungers of the valves mounted on the wheel ring through a yoke which provides a self-holding action. Thus, adjusting of proper valve operation is facilitated while the operation of the blow molding machine is continued.

12 Claims, 3 Drawing Sheets

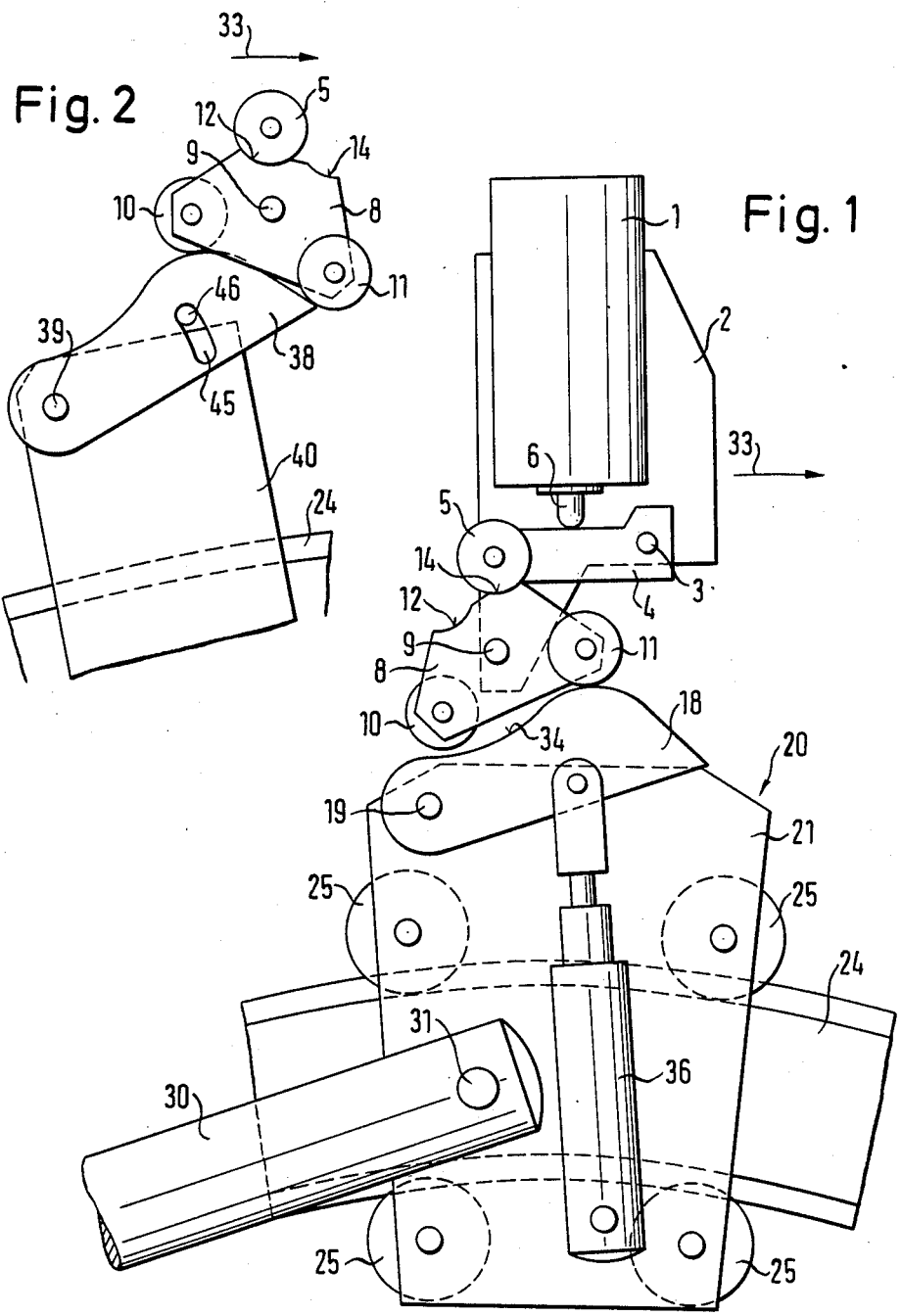

BLOW MOLDING MACHINE

FIELD OF THE INVENTION

The invention relates to a blow mold machine, in particular to control means for actuating the valves provided for supplying blowing air to the blow mold sections mounted along the outer periphery of the blowing wheel of a blow mold machine.

BACKGROUND OF THE INVENTION

According to the prior art parisons heated to blowing temperature while carried on blowing mandrels are delivered to a blow wheel and inserted between blow mold sections. After closing the blow mold sections a stretching rod is inserted from below in the parisons, said rod extending through the blowing mandrel. The parison is stretched and blowing air introduced to blow the parison to a hollow article. The supply of blowing air is controlled by a valve which is provided for each blow mold station. This valve must be opened at a predetermined time, must be then maintained open during a predetermined time and must be finally closed again. Furthermore, cylinders to be actuated by pressurized air for actuating the blow mold sections, possibly a bottom mold section and the stretching rod must be provided which cylinders have to be supplied with pressurized air as well.

SUMMARY OF THE INVENTION

It is an object of the present invention to provide a control means for the valves mounted on the blowing wheel in particular for the blowing air supply valve. The control means of the present invention is of a simplified structure and makes it possible to adjust the valves during operation of the machine to improve the blowing process.

It is a further object to reduce the costs of manufacturing and to improve the versatility of the blow molding machine, in particular with a view to facilitate adjusting the machine to determine the timed sequence of actuating the individual valves.

The present invention provides for a blow molding machine comprising a wheel rotatably supported about a vertical axis, a drive means for rotating said wheel, a plurality of blow mold stations mounted on the wheel along the periphery thereof, a plurality of blowing mandrels each carrying a parison made of thermoplastic material to be inserted in one of said blow mold stations for being enclosed therein and blown to a hollow article, further comprising a valve mounted on said wheel for supplying pressurized fluid and a stationary cam control means to actuate said valve wherein at least a carriage is adjustably mounted on a stationary ring which is provided within the blow wheel and wherein a plurality of cams for actuating said valve is adjustably mounted on said carriage.

According to a further aspect of the present invention the blowing air supply valve is actuated by a self-holding means comprising a rocker or yoke which is pivoted to actuate the valve plunger through a lever. The trigger lever of the valve carries a roller which either engages a first or a second recess of the yoke according to the position thereof. For example, the valve is closed and maintained in the closed position by the self-holding means when the roller engages a first recess. In pivoting the yoke the roller comes in engagement with the second recess, the valve opens and is maintained in this position by the self-holding means. The yoke is actuated by stationary cams along which the yoke passes, wherein the yoke is actuated by a first cam to take a first position and then by a second cam to take a second position. The cams are provided in different positions one above the other so that one end of the yoke each cooperates with one of the cams.

According to a further aspect of the invention the cams are mounted on a carriage which is supported on a ring to be movable and adjustable along the periphery of the ring. The ring is mounted on columns provided within the blow wheel. The blow wheel is defined by a wheel ring which is rotatably supported in a bearing means which is provided radially outward of the ring so that the blow wheel is of a center-free structure which makes it possible to mount stationary columns within the wheel ring.

The carriage is adjustable along the periphery by a screw drive actuated by an electrical motor which is controlled from remote to properly adjust the closing and opening times of the valves during operation of the machine.

Further valves for controlling the supply of pressurized fluid to cylinders for actuating the blow mold sections and the stretching rod may be controlled by corresponding means. Alternately the cams for controlling these valves may be mounted directly on holders secured to the ring when peripheral adjustment is not necessary during operation. A plurality of cams one above the other may be provided at each carriage which cams cooperate with valves.

Additional advantages and benefits of the present invention will become apparent upon a reading of the description of the preferred embodiments taken in conjunction with the accompanying drawing.

BRIEF DESCRIPTION OF THE DRAWING

FIG. 1 is a top view of a valve and a carriage including a cam for actuating a yoke to take a first position FIG. 2 is a top view of a cam for actuating the yoke to take a second position

DETAILED DESCRIPTION OF THE INVENTION

Figure 3:
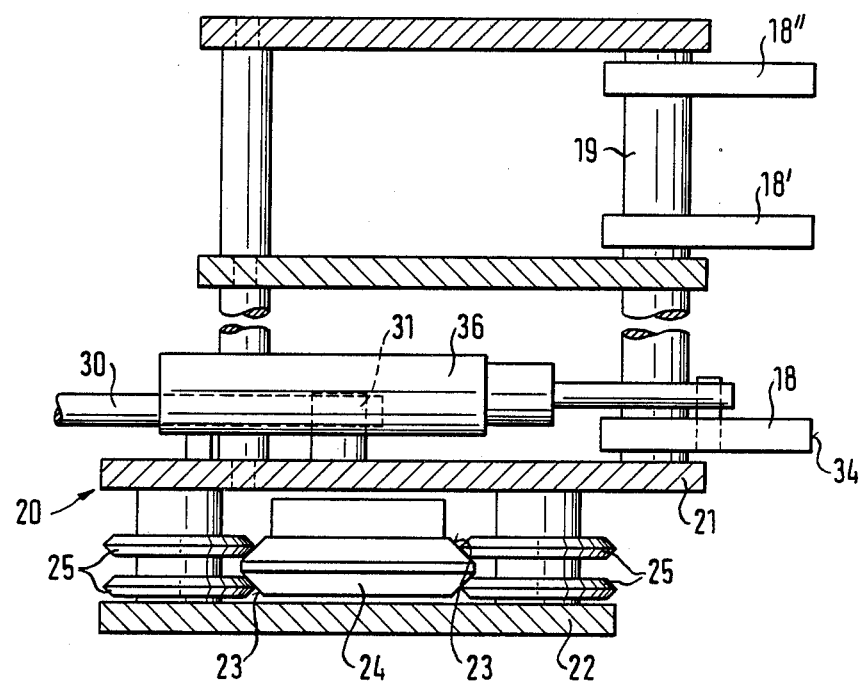
FIG. 3 is a sectional side view of a carriage including a cam and FIG. 4 is a sectional side view of a blowing wheel.

FIG. 1 shows a valve 1 controlling the air supply connections between a pressure source, a blow mold and atmosphere according to the position of the valve member not shown. The valve 1 is secured to a plate 2 to which a lever 4 is pivotally mounted at 3, the free end of the lever 4 carrying a roller 5, the lever acting on the plunger 6 of the valve 1 substantially half way up the length of the lever. A yoke 8 is pivotally supported around an axis 9 on the plate 2. The yoke has a triangular shape and rotatably supports at either corner a roller 10 and a roller 11, while the third corner is provided with a pair of recesses 12 and 14 adjacent to each other for coming in engagement with the roller 5 of the lever 4.

In the embodiment shown the valve plunger 6 is pushed inwardly in the position of the yoke shown so that the valve 1 is opened and pressurized fluid is supplied from the pressure source to a blow mold not shown. When the yoke is switched into the position shown in FIG. 2 according to which the roller 5 of the lever 4 comes in engagement with the recess 12, the lever 4 pivots anti-clockwise around pin 3, the plunger 6 follows and the valve 1 closes.

For actuating the yoke 8 FIG. 1 shows a cam 18, which is pivotally supported around an axis 19 at a carriage 20. As shown in FIG. 1 taken in conjunction with FIG. 3 the carriage 20 comprises a pair of plates 21 and 22 which are connected to each other in a distance, one above the other. In the space between the plates 21 and 22 a guide rail 24 is provided of which either end defines a prismatic profile having lower and upper bevel faces 23, 24. The rollers 25 rotatably supported in the plates 21, 22 are provided with a mating- profile to contact the faces 23, 24 to provide a guiding of the carriage 20 along the rail 24 which is free of play and which provides for supporting all axial and radial forces acting on the carriage 20.

The carriage 20 is displaced on the rail 24 preferrably by a screw drive 30 not shown in detail as any prior art screw drive may be used. The movable member of the screw drive 30 is secured to a pin 31 connected to the carriage 20, while the stationary member not shown is secured to a base. The screw drive is actuated by an electrical motor to adjust the proper position of the carriage 20 and of the cam 18 with respect to the yoke 8. Preferably, the screw drive is remotely operated.

When the valve 1 and the carriage 20 are moved relative to each other, in particular when the valve 1 is moved in the direction of arrow 33, the forward roller 11 of the yoke 8 engages the guide face of the cam 18, the yoke 8 rotates anti-clockwise around the axis 9 and the roller 5 engages the recess 14. The valve 1 opens and the yoke 8 is maintained in self-holding position. Since the roller 5 of the lever 4 is held in the recess 14 and the pivot axis 9 between the rollers 10 and 11 lies below the roller 5 of the lever 4 and since the axes 5, 9 are approximately aligned with the recess 14, the device maintains the position shown in FIG. 1 after the roller 11 leaves the cam 18. FIG. 1 shows that the spring loaded valve plunger 6 can not turn the yoke around the axis 9, when the path of the roller 5 in pivoting intersects the axis 9. The rollers 10 and 11 are arranged on different faces of the platelike yoke 8 so that cam 18 actuates only the roller 11 and not the roller 10. The cam 18 is pivoted around the axis 19 by a cylinder 36 and can be removed from the path of the roller 11 when it is desired, for example, when there is no corresponding blow mold station provided or when there is no parison in the station.

To close the valve 1 the yoke 8 is actuated by a cam 38 following the first one. Cam 38 is pivotally mounted on the carriage 40 around axis 39. The cam 38 is located at the yoke 8 below the roller 11 so that the roller 10 only cooperates with the cam 38 to pivot the yoke 8 clockwise around the axis 9 and to move the roller 5 of the lever 4 from the recess 14 to the adjacent recess 12 in which the valve 1 comes to a self-hold to maintain the valve closed. A fine adjustment of the cam 38 is made by a screwed pin 46 extending through a slot 45. The carriage 40 is adjusted peripherally along the rail 24 by a screw drive shown in FIG. 1. When this is not required the carriage 40 is locked to the rail 24 in a certain position.

FIG. 3 shows that the carriage comprises a number of cams 18, 18′, 18″ the latter ones actuating further valves not shown.

Figure 4:
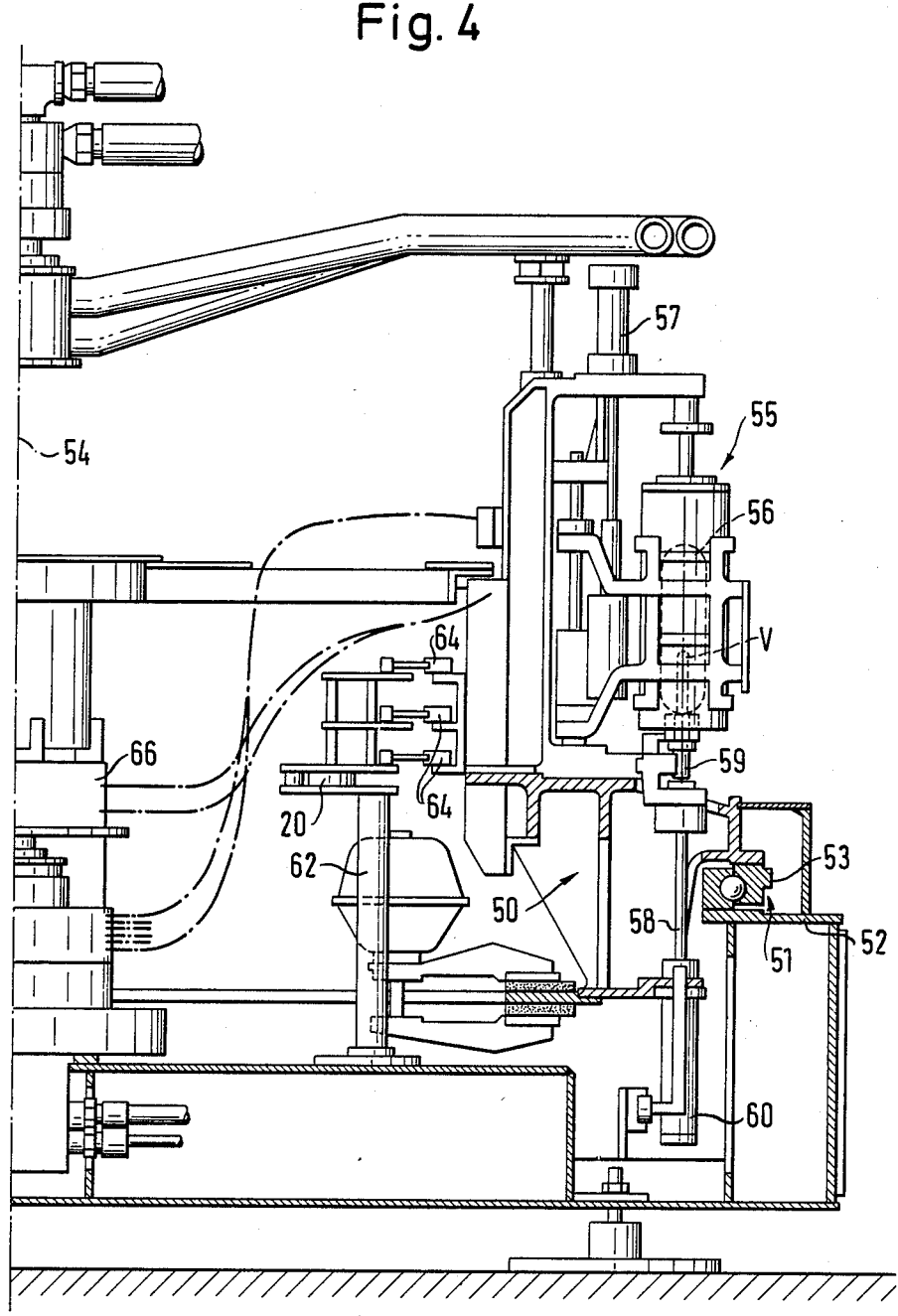

FIG. 4 shows the control means mounted on a blow wheel of a blow molding machine. The blow wheel is defined by a center-free wheel ring 50 of which the outer peripheral rim is rotatably supported on a base 52 through a ball bearing connection 51. The ball bearing means includes outer teeth 53 for continuously driving the wheel ring 50 around a vertical axis 54. A number of blow mold stations 55 are mounted along the outer periphery of the wheel ring 50. The blow mold sections of which a section 56 is shown are actuated through a cylinder 57, while a stretch rod 58 for the parison V placed on a blowing mandrel 59 is actuated by a stretching cylinder 60.

An annular member is mounted on columns 62 within the wheel ring 50 which member is suited to mount the carriages 20, 40 as shown in FIG. 3 for the rail 24. Valves 64 are mounted on the wheel ring 50 for cooperation with the cams mounted on the carriage. Blowing air as well as pressurized air for actuating the cylinders 57, 60 is supplied in the center of the machine via a rotating control valve 66. As the wheel ring is center-free due to the peripheral support by means of the anti-friction bearing 51 the control means may be provided within the ring on columns 62 and the valves 64 are mounted to the inner side of the wheel ring at a readily accessible location.

We claim:

1. A blow molding machine comprising:
   a wheel rotatably supported about a vertical axis,
   a drive means for rotating said wheel,
   a plurality of blow mold stations mounted on a periphery of the wheel, each station of said plurality of stations comprising a blow mold, a blowing mandrel carrying a parison made of thermo plastic material to be inserted into said blow mold and blown to a hollow article, and at least one valve having a plunger for supplying blowing fluid to said blow mold,
   a plurality of carriages adjustably mounted on a stationary ring provided interior to the periphery of the wheel, and
   a cam adjustably mounted on each carriage of said plurality of carriages for actuating said at least one valve.

2. The blow molding machine of claim 1, wherein each carriage is provided with rollers engaging a stationary guide rail.

3. The blow molding machine of claim 2, wherein a cross-section of the guide rail includes a prismatic profile having beveled edges, the rollers engaging the beveled edges of said profile.

4. The blow molding machine of claim 2, wherein each carriage is adjustable along the guide rail by means of a screw drive.

5. The blow molding machine of claim 1, wherein said wheel has an elevated clearance interior to the periphery and is rotatably supported about the vertical axis by a peripheral bearing connection.

6. The blow molding machine of claim 2, wherein the guide rail is annular and is mounted on columns which are provided interior to the periphery of the wheel.

7. The blow molding machine of claim 1, wherein said cam is pivotally adjustable at each carriage.

8. The blow molding machine of claim 1, wherein a yoke is provided for actuating the plunger of said at least one valve, wherein said yoke is actuated by a first cam on a first carriage into a first yoke position in which said at least one valve takes a first valve position and by a second cam on a second carriage into a second yoke position in which said at least one valve takes a second valve position.

9. The blow molding machine of claim 8, further comprising a valve mounting means including a pivot axis for pivotally supporting said yoke comprising a pair of adjacent recesses which are engageable by a valve lever actuating the plunger.

10. The blow molding machine of claim 9, wherein the pair of recesses and the pivot axis of said yoke are located on a circle around a pivot of the valve lever.

11. The blow molding machine of claim 8, wherein the yoke includes a pair of rollers which are actuated one after the other by a plurality of cams mounted at different heights.

12. The blow molding machine of claim 11, wherein the plurality of cams are mounted on the plurality of carriages one above the other for cooperation with a plurality of valves mounted on the periphery of the wheel.

* * * * *